United States Patent
Beck et al.

(10) Patent No.: US 7,795,776 B2
(45) Date of Patent: Sep. 14, 2010

(54) OSCILLATION DAMPING SYSTEM FOR A STATOR OF AN ELECTRICAL MACHINE

(75) Inventors: Ronald Beck, Heidenheim (DE); Ulrich Ehehalt, Essen (DE); Waldemar Kowalski, Mülheim an der Ruhr (DE); Christoph Lehmann, Neukirchen-Vluyn (DE); Christoph Richter, Ibbenbüren (DE); Karlheinz Spiess, Moers (DE)

(73) Assignee: Siemens Aktiengesellschaft, Munich (DE)

( * ) Notice: Subject to any disclaimer, the term of this patent is extended or adjusted under 35 U.S.C. 154(b) by 120 days.

(21) Appl. No.: 12/223,363

(22) PCT Filed: Jan. 5, 2007

(86) PCT No.: PCT/EP2007/050102

§ 371 (c)(1),
(2), (4) Date: Nov. 20, 2008

(87) PCT Pub. No.: WO2007/088085

PCT Pub. Date: Aug. 9, 2007

(65) Prior Publication Data

US 2009/0302696 A1    Dec. 10, 2009

(30) Foreign Application Priority Data

Jan. 31, 2006  (EP) .................................. 06001998

(51) Int. Cl.
*H02K 3/46*  (2006.01)

(52) U.S. Cl. ........................................ 310/260; 310/51

(58) Field of Classification Search ............... 310/51, 310/260, 52–59
See application file for complete search history.

(56) References Cited

U.S. PATENT DOCUMENTS

| | | | | | |
|---|---|---|---|---|---|
| 2,618,756 | A | * | 11/1952 | Fechheimer | 310/54 |
| 2,873,393 | A | * | 2/1959 | Baudry | 310/55 |
| 3,110,827 | A | * | 11/1963 | Baudry | 310/55 |
| 3,924,149 | A |   | 12/1975 | Estrada et al. | |
| 3,988,625 | A | * | 10/1976 | Jager et al. | 310/260 |
| 4,088,913 | A | * | 5/1978 | Prigorovsky et al. | 310/260 |
| 4,344,006 | A | * | 8/1982 | Mendelsohn | 310/43 |
| 4,387,317 | A | * | 6/1983 | Alkire et al. | 310/260 |
| 4,488,079 | A | * | 12/1984 | Dailey et al. | 310/260 |
| 4,501,985 | A | * | 2/1985 | Dobson et al. | 310/270 |
| 4,782,579 | A | * | 11/1988 | Rowe et al. | 29/596 |
| 5,177,385 | A | * | 1/1993 | Cooper et al. | 310/53 |
| 2004/0032182 | A1 |   | 2/2004 | Rowe et al. | |

FOREIGN PATENT DOCUMENTS

| | | |
|---|---|---|
| DE | 28 48 908 A1 | 6/1980 |
| DE | 44 24 215 A1 | 1/1996 |
| DE | 197 55 569 A1 | 6/1999 |
| EP | 0 691 728 A1 | 1/1996 |
| EP | 0 950 279 B1 | 10/1999 |
| GB | 1 409 236 | 10/1975 |

* cited by examiner

*Primary Examiner*—Thanh Lam

(57) ABSTRACT

An oscillation damping system for stator windings is provided which includes a supporting component of an end winding. The supporting component is equipped with damping elements, which are arranged asymmetrically in the circumferential direction in order to suppress excited natural oscillations. Masses or springs and screw-type restraints which connect the supporting component to the stator housing are suitable as damping elements.

10 Claims, 2 Drawing Sheets

OSCILLATION DAMPING SYSTEM FOR A STATOR OF AN ELECTRICAL MACHINE

CROSS REFERENCE TO RELATED APPLICATIONS

This application is the US National Stage of International Application No. PCT/EP2007/050102, filed Jan. 5, 2007 and claims the benefit thereof. The International Application claims the benefits of European application No. 06001998.1 EP filed Jan. 31, 2006, both of the applications are incorporated by reference herein in their entirety.

FIELD OF INVENTION

The invention relates to an oscillation damping system for a stator of an electrical machine, in particular of a generator.

BACKGROUND OF INVENTION

A system such as this is known, for example, from EP 0 950 279 B1.

The system according to EP 0 950 279 B1 adopts the approach of setting the natural frequency of the windings of a stator to an appropriately high level, by suitable mechanical loading of the stator windings which are held on a winding support strut. For this purpose, the oscillation damping system has a thrust block, which is arranged between the winding support strut and the windings, as well as a plurality of springs which load the windings. EP 0 950 279 B1 says nothing about any phase relationship between natural oscillations of the stator and other oscillations which occur in the electrical machine.

SUMMARY OF INVENTION

The invention is based on the object of specifying an oscillation damping system for a stator of an electrical machine, in particular for an end winding of a generator, which is particularly effective.

According to the invention, this object is achieved by an oscillation damping system having the features of the independent claims. This system, which is suitable for an electrical machine having a stator and a rotating component, in particular for a generator or a motor, comprises a winding which is held on a supporting component of the stator. At least one of the design features comprising the form and attachment of the supporting component has an asymmetry which acts to damp oscillations when the stator is cyclically excited by the rotating component of the electrical machine. The supporting component is, in particular, a supporting structure for an end winding of the electrical machine.

The invention is based on the idea that the magnetic forces in the stator describe the form of a revolving wave. This wave has a plurality of nodes, the number of which depends on the type of winding, and revolves at the rotor rotation speed. In the case of a stator end winding with a cyclically periodic form, a mechanical oscillation could also be formed with a number of nodes corresponding to the revolving wave. Depending on the resonance characteristics, which are governed by the type of stator, the stator will be caused to oscillate by the periodic excitation and, in the extreme, this can lead to destruction of components. In general, any excitation pattern whose force pattern is not orthogonal to the natural oscillation can introduce energy into a natural oscillation.

In order to avoid such excitation of natural oscillations, in the case of the stator designed according to the invention, the cyclic periodicity of a load-bearing component, in particular of a supporting component of the end winding, is deliberately interfered with. This is done, for example, by a distribution of masses which does not follow any symmetry pattern, preferably by means of reinforced areas and/or cutouts in the supporting component. In any case, this makes it possible to achieve at least approximate orthogonality between the natural oscillation and the excitation force. This minimizes the scale of the product between the natural oscillation and the excitation pattern. Energy transfer from the revolving wave caused by the magnetic forces to the stator, which can be considered to be a system which can oscillate, is therefore possible at most only to a very minor extent. In the end, exciting periodic loads caused by the current flow in the stator do not lead to any relevant additional loads on the components of the stator.

If the oscillation-damping characteristics are achieved by the nature of the attachment of the stator to a surrounding structure, the stator is preferably elastically linked to the surrounding structure, in particular to a housing of the stator. It is particularly preferable for the supporting component of the stator to be prestressed with respect to the surrounding structure, by means of a supporting structure.

According to a further refinement, which can be combined with the features mentioned above, at least one additional weight is attached to the supporting component, in order to produce a defined asymmetry of the stator. The oscillation-damping effect of additional weights can also be achieved by asymmetrically distributed cutouts in the supporting component which can be provided in addition to additional weights or as the only asymmetric structures.

Irrespective of whether the asymmetry of the supporting component is provided by the nature of its link to an at least approximately rigid surrounding structure and/or by the mass distribution within the supporting component, this results in natural oscillations of the stator in relation to excitation oscillations of the rotating component of the electrical machine having a mode-form mismatch. Cyclically changing electromagnetic forces whose frequency corresponds to the rotor rotation speed and which act between the stator and rotor are considered to be excitation oscillations of the rotating component.

A separate damping element is not necessarily a component of the oscillation damping system. In order to achieve particularly pronounced oscillation-damping characteristics, however, it is possible in one advantageous refinement to combine the oscillation damping system with an additional damping system, in particular with an active damping system whose characteristics are controllable.

In any case, the system-immanent suppression of vibrations in the stator, in particular in the stator end winding, reduces the mechanical load on it, thus lengthening its life. In particular, this avoids the formation of friction dust, and the end winding assembly on the stator becoming loose.

The advantage of the invention is, in particular, that oscillation-damping characteristics for a stator in an electrical machine have a rotating component are achieved by the asymmetric geometry and/or attachment of a supporting component to which the stator windings are fitted, thus resulting in a system which works passively and is therefore extremely robust, for suppression of oscillations.

BRIEF DESCRIPTION OF THE DRAWINGS

A plurality of exemplary embodiments of the invention will be explained in more detail in the following text with reference to a drawing, in which, in each case illustrated symbolically.

DETAILED DESCRIPTION OF INVENTION

Mutually corresponding parts or parts having the same effect are annotated with the same reference symbols in all the figures.

Figure 1:
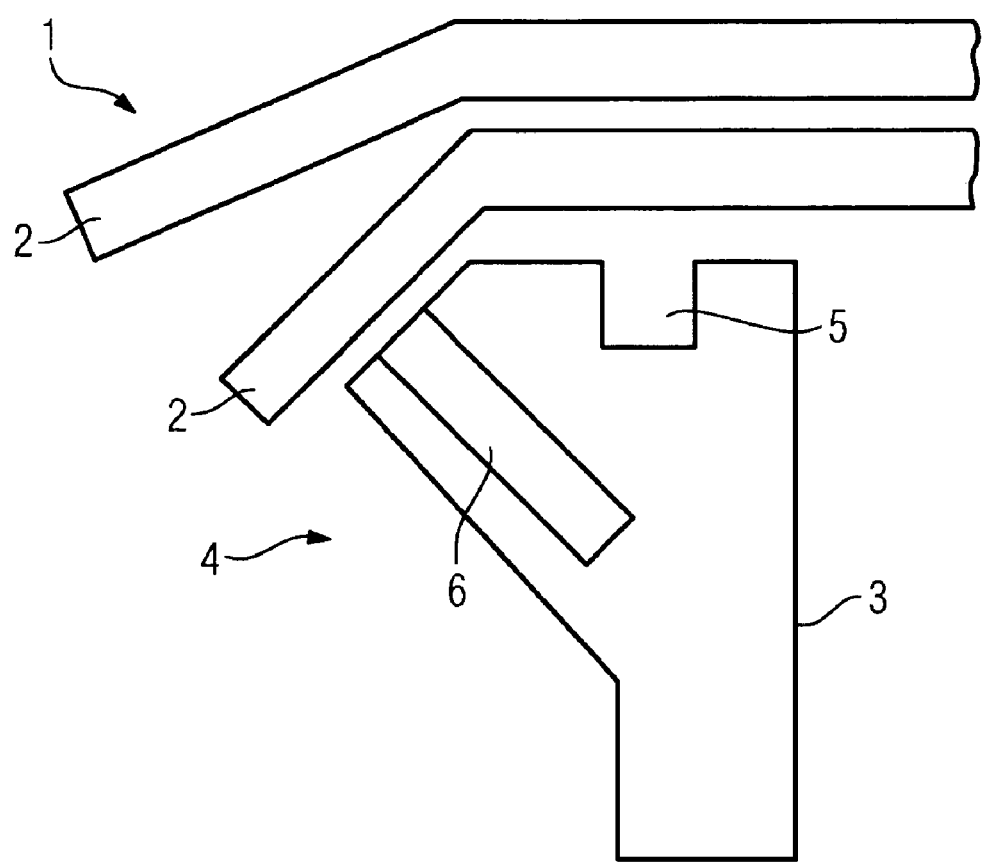
FIG. 1 shows an outline illustration of a stator of an electrical machine with an oscillation-damping supporting component, and FIGS. 2 to 4 each show one embodiment of an oscillation-damping end winding of a stator.

FIG. 1 shows, in a roughly schematic form, a detail of a stator 1 of a generator, specifically a part of the end winding 4 of the stator 1. Reference is made to EP 0 950 279 B1 with regard to the basic design and operation of the stator 1. A winding 2 is held on a supporting component 3. In contrast to the symbolized illustration, the parts 2, 3 of the end winding 4 of the stator 1 are coupled to one another to transmit force.

Electromagnetic forces act between the winding 2 and a rotor, which is not illustrated, of the generator during its operation and represent a wave which revolves in a corresponding manner to the rotation speed of the rotor and has a number of nodes depending on the type of generator. If the end winding 4 has a cyclically periodic form, not shown here, a mechanical oscillation could be formed in the end winding 4 when given resonance conditions are satisfied, and this likewise has nodes the number of which corresponds to the excitation oscillation.

The occurrence of resonance such as this is prevented by deliberately interfering with the cyclic periodicity of the end winding 4, thus providing oscillation-damping characteristics for the stator 1 by means of the asymmetric form, which in particular is not rotationally symmetrical, of the supporting component 3 for the stator 1. Both a cutout 5 and a reinforcing strip 6 form elements to counter stator oscillations.

Various specific embodiments of electrical machines which are designed with oscillation-damping characteristics, specifically generators, will be explained in the following text with reference to FIGS. 2 to 4, although the winding 2 in the end winding 4 is not illustrated, for the sake of clarity.

Figure 2:
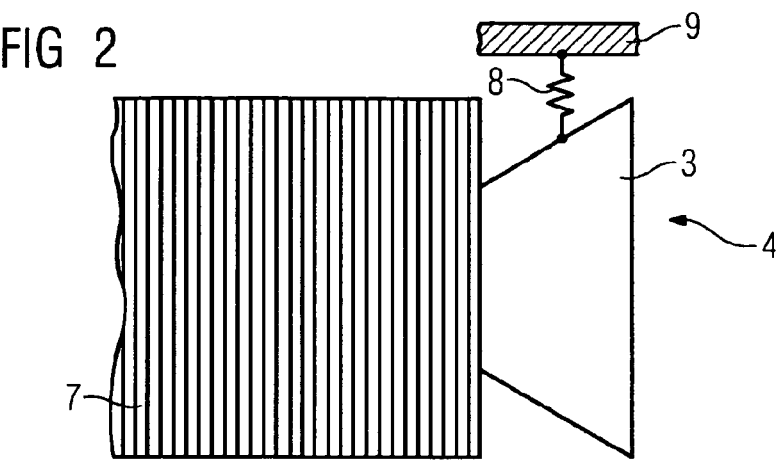

In the exemplary embodiment shown in FIG. 2, the end winding 4, which is adjacent to a laminated core 7 of the stator 1 is elastically linked by means of a spring element 8 to a fixed-position component 9, namely a housing of the stator 1. If a plurality of spring elements 8, preferably also with damping characteristics, are provided in order to connect the end winding 4 to the housing 9, in a manner which cannot be seen in the illustration, then the points at which the spring elements 8 introduce forces into the supporting component 3 of the end winding 4 are distributed asymmetrically on the end winding 4. The mechanical characteristics of the at least one spring element 8 can preferably be adjusted by remote control. In this way, the natural oscillations of the end winding 4 can be adjusted to achieve the maximum oscillation-damping effect, during operation of the generator.

Figure 3:
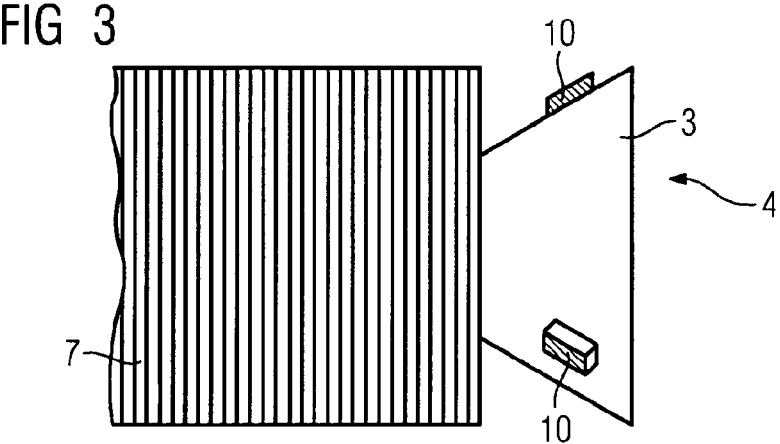

The exemplary embodiment in FIG. 3 shows an end winding 4 with additional weights 10 which are attached to it and are arranged distributed asymmetrically on the circumference of the end winding 4. When the generator is stationary, the additional weights 10 can be replaced as required, or can be attached in a different point on the supporting component 3, in order to adjust the oscillation characteristics of the end winding 4 in the desired manner. In any case, an effect which suppresses stator oscillations is achieved by deliberately introduced asymmetries. In a manner which is not illustrated, the end winding 4 may additionally have cutouts 5 (see FIG. 1) whose geometry is preferably at the same time used for carrying lines which tap off current produced in the generator.

Figure 4:
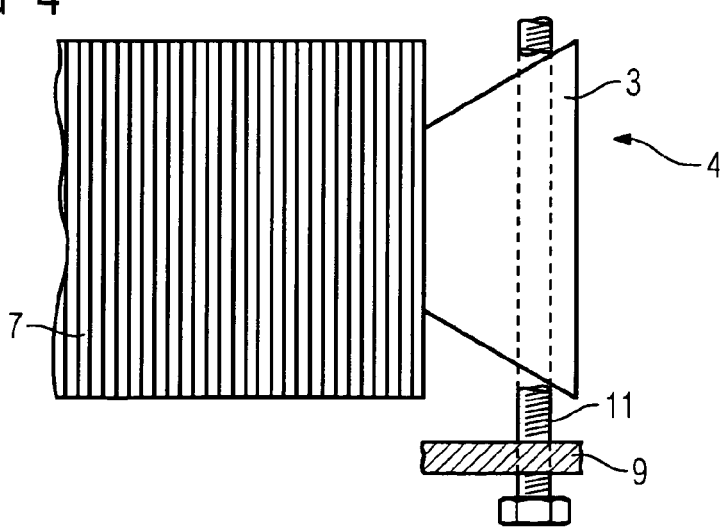

In the exemplary embodiment shown in FIG. 4, the end winding 4 of the generator is braced to the housing 9 by means of a supporting structure 11 which is essentially in the form of a bolt. In comparison to the exemplary embodiment shown in FIG. 2 (see the spring element 8), the supporting structure 11 is designed to be considerably stiffer, and also carries out a static function. At the same time, the supporting structure 11 has elastic characteristics, by which means the oscillation characteristics of the stator 1 are changed in a relevant manner, that is to say in the same way as in the case of the other exemplary embodiments, achieving a mode-form mismatch between the stator oscillations.

The invention claimed is:

1. An oscillation damping system for a stator of an electrical machine, comprising:
a winding held on a supporting component of the stator, the supporting component comprising a form and a way of attachment to the stator, wherein at least one of the form and the way of attachment has an asymmetry which acts to damp oscillations when the stator is cyclically excited by the rotating component of the electrical machine; and
a weight attached to the supporting component in order to produce an asymmetry of the stator.

2. The oscillation damping system as claimed in claim 1, wherein an end winding of the stator is asymmetric in order to damp oscillations.

3. The oscillation damping system as claimed in claim 2, wherein a supporting structure braces the end winding with respect to a fixed-position component of the electrical machine.

4. The oscillation damping system as claimed in claim 3, wherein the fixed-position component is a housing of the stator.

5. The oscillation damping system as claimed in claim 4, wherein the asymmetry of the supporting component is adjusted such that a natural oscillation of the stator in relation to the exciting oscillations of the rotating component of the electrical machine has a mode-form mismatch.

6. The oscillation damping system as claimed in claim 2, wherein an elastic link is provided between the end winding and a fixed-position component.

7. The oscillation damping system as claimed in claim 6, wherein a supporting structure braces the end winding with respect to a fixed-position component of the electrical machine.

8. The oscillation damping system as claimed in claim 7, wherein the fixed-position component is a housing of the stator.

9. The oscillation damping system as claimed in claim 1, wherein the asymmetry of the supporting component is adjusted such that a natural oscillation of the stator in relation to the exciting oscillations of the rotating component of the electrical machine has a mode-form mismatch.

10. The oscillation damping system as claimed in claim 9, wherein a natural oscillation of the stator is at least approximately orthogonal to an exciting oscillation of the rotating component of the electrical machine.

* * * * *